(No Model.)

L. R. FAUGHT.
Worm and Worm Wheel Gearing.

No. 243,234. Patented June 21, 1881.

WITNESSES:
Geo. B. Collier
George T. Kelly.

INVENTOR
L. R. Faught
by Collier & Bell,
attys.

UNITED STATES PATENT OFFICE.

LUTHER R. FAUGHT, OF PHILADELPHIA, PENNSYLVANIA.

WORM AND WORM-WHEEL GEARING.

SPECIFICATION forming part of Letters Patent No. 243,234, dated June 21, 1881.

Application filed May 7, 1881. (No model.)

*To all whom it may concern:*

Be it known that I, LUTHER R. FAUGHT, of the city and county of Philadelphia, in the State of Pennsylvania, have invented certain new and useful Improvements in Worm and Worm-Wheel Gearing, of which improvements the following is a specification.

My improvements relate to mechanism of the class in which, a slow and strong movement being required, the effect of the application of a relatively small power and high speed is by the employment of worm and worm-wheel gearing exerted in the development of a higher power at a correspondingly lower speed—as, for example, hoists, capstans, &c. Mechanism of such description as ordinarily constructed is defective in its operation, for the reasons, first, that from the limited amount of bearing-surface admissible between the driving-worm and driven worm-wheel, the pressure resultant upon the resistance of the load brings the working-surfaces into contact under excessive pressure, and thereby involves undue friction and consequent loss of power and rapid wear of the parts; second, the power transmissible from the worm-wheel to the load is restricted to the limit imposed by the strength of the small number of teeth of the worm-wheel which are at any period of its revolution in contact with the worm.

The object of my invention is to obviate the objections before noted by the provision of increased area in the working-surfaces of the gearing without notably increasing the dimensions, weight, or cost of the apparatus. To this end my improvements consist in the combination, with a worm-wheel and its shaft, of a series of worms located in the same axial plane and connected each with the others, so as to be rotated one by the other from a common driving-wheel, the several worms meshing with the worm-wheel at different tangents to its pitch-circle; and, also, in the combination of a worm-wheel, a series of worms meshing therewith, and a chambered frame or casing having alternately-arranged outer and inner bearings for the several worms and bearings for the worm-wheel, and acting as an oil-reservoir for the gearing, all as hereinafter more fully set forth.

Figure 1:
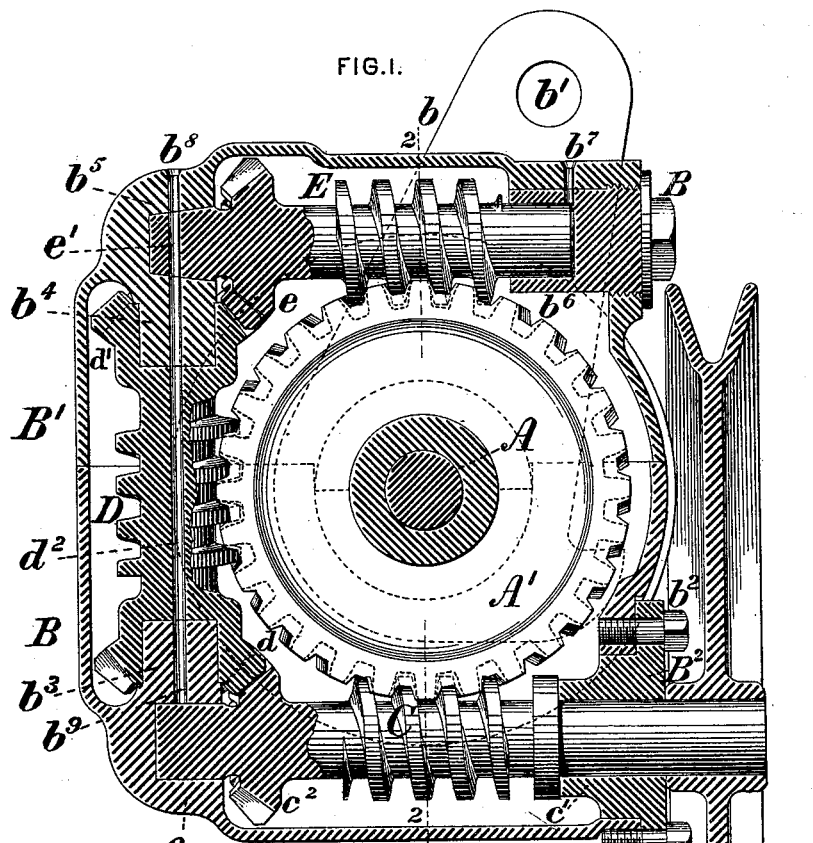
Figure 2:
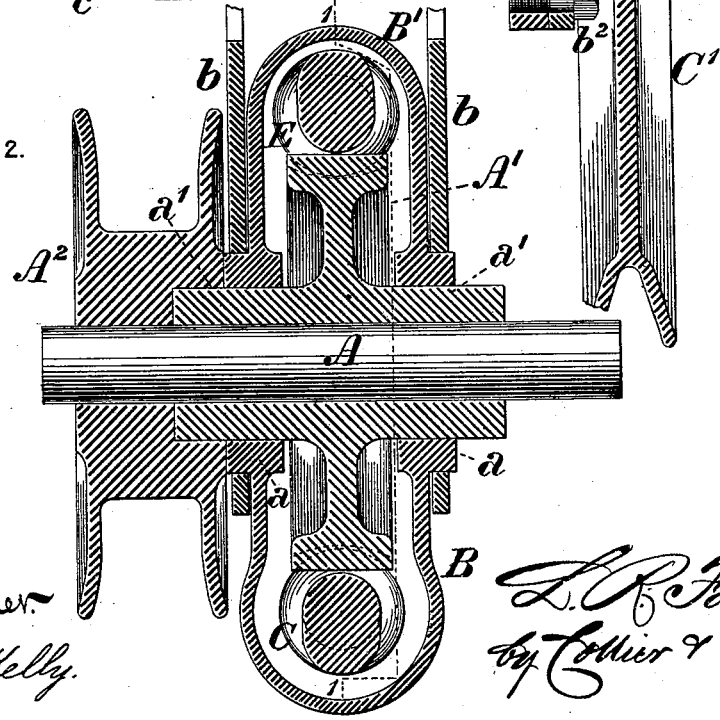

In the accompanying drawings my improvements are shown as applied to a hand-hoist, Figure 1 being a vertical longitudinal section at the line 1 1 of Fig. 2, and Fig. 2 a vertical transverse section at the line 2 2 of Fig. 1.

To carry out my invention, I secure upon a shaft, A, to which the load is to be attached, a worm-wheel, A', the hub of which is prolonged to form journals $a'$, which fit in bearings $a$ in a chambered frame or casing composed of a lower section, B, and an upper section, B', connected together and supported by a pair of suspending-links, $b$, having eyes in their lower ends to receive the bearings $a'$ of the case, and eyes $b'$ in their upper ends for connection to any suitable fixed support. A load chain-wheel, $A^2$, is fitted upon the shaft A, so as to rotate therewith, either by being keyed thereto or furnished with clutching-jaws on one of its ends, engaging similar jaws on the worm-wheel A'. A hand chain-driving wheel, C', is secured upon the outer end of a worm, C, the journals of which fit in bearings $c\ c'$, formed, respectively, in one of the sections of the case and in a removable bonnet, $B^2$, secured thereto by bolts $b^2$. The power applied to the rotation of the driving-wheel C' is transmitted to the worm-wheel A' through a tangential series of two or more worms, in this instance three in number, C, D, and E, all located in the same axial plane, to the first of which the driving-wheel C' is, as before stated, connected, and which are simultaneously rotated, either as shown by means of the bevel-gears $c^2$ and $d$ of the worms C and D, and $d'$ and $e$ of the worms D and E respectively, or by universal joints, the latter method being preferably adopted where a larger number of worms is employed, as in such case their axes are located at a relatively greater angle one with the other. The several worms are fitted alternately in external and internal bearings, the worm C rotating in the external bearings $c\ c'$, the worm D being recessed at its ends to fit the internal cylindrical bearings $b^3\ b^4$, formed, respectively, in the lower and upper sections of the casing, and the worm E, having journals rotating in the bearings $b^5\ b^6$, formed, respectively, in the upper section, B', of the casing and in a removable piece, $B^3$, screwed therein. The lubrication of the gearing is effected through the oil-passages $b^7\ b^8$, the former leading to the bearing $b^6$, and the latter to the bearing $b^5$, being continued through the same and through the adjacent bearing $b^4$, and communicating with a central oil-passage, $d^2$, formed in the worm D. An oil-passage, $b^9$, in the lower bearing, $b^3$, of the worm D, communicates at top with the passage $d^2$, and at bottom with the bearing $c$ and the worm C, and a passage, $e'$, in the worm E, in line with the passages $b^8$, $d^2$, and $b^9$, enables lubricating material to be introduced directly to said bearing when required. The case, being entirely closed, serves, further, as an oil-reservoir, and retains the surplus lubricating material from the bearings, which serves to act upon the teeth of the contained gearing.

It will be seen that my improvements afford the advantage of increasing in duplicate, triplicate, or greater ratio, the area of working-surface of the driving and driven members, and this without material increase in the size of the apparatus and without involving complex or delicate mechanism.

I am aware that a double worm-wheel having two independent sets of teeth upon its periphery, combined with two parallel worms, each meshing with one of the sets, has been heretofore known, and do not, therefore, broadly claim the application of a series of worms to the rotation of a shaft.

I claim as my invention and desire to secure by Letters Patent—

1. The combination, substantially as set forth, of a worm-wheel secured upon a shaft from which power is to be imparted, and two or more worms, located angularly one to the other in the same axial plane and rotated by a single driving wheel, said worms meshing with the worm-wheel at different tangents to the pitch-circle of a single series of teeth upon its periphery.

2. The combination, substantially as set forth, of a worm-wheel and its shaft, a tangential series of worms meshing with said worm-wheel, and a chambered case having alternate pairs of external and internal bearings for the worms.

L. R. FAUGHT.

Witnesses:
J. SNOWDEN BELL,
GEO. T. KELLY.